(12) United States Patent
Burgett et al.

(10) Patent No.: US 10,004,930 B2
(45) Date of Patent: Jun. 26, 2018

(54) TOOL FOR INSERTING COMPONENTS OF A FLAME ARRESTOR ASSEMBLY INTO A PROCESS CONTROL DEVICE

(71) Applicant: TESCOM CORPORATION, Elk River, MN (US)

(72) Inventors: Eric J. Burgett, McKinney, TX (US); Jacob T. R. Renollett, Andover, MN (US)

(73) Assignee: TESCOM CORPORATION, Elk River, MN (US)

( * ) Notice: Subject to any disclaimer, the term of this patent is extended or adjusted under 35 U.S.C. 154(b) by 0 days. days.

(21) Appl. No.: 15/193,288

(22) Filed: Jun. 27, 2016

(65) Prior Publication Data

US 2016/0375290 A1 Dec. 29, 2016

Related U.S. Application Data (60) Provisional application No. 62/184,369, filed on Jun. 25, 2015.

(51) Int. Cl.
| | |
|---|---|
| *B25B 27/14* | (2006.01) |
| *A62C 4/00* | (2006.01) |
| *G01L 19/06* | (2006.01) |

(52) U.S. Cl.
CPC ............ *A62C 4/00* (2013.01); *G01L 19/0663* (2013.01)

(58) Field of Classification Search
USPC .......................................... 29/270, 271, 272
See application file for complete search history.

(56) References Cited

U.S. PATENT DOCUMENTS

| | | | | |
|---|---|---|---|---|
| 6,023,991 A | * | 2/2000 | Yabe | F16H 25/2418 74/89.44 |
| 6,634,246 B2 | * | 10/2003 | Ohya | F16H 25/2418 74/467 |
| 2003/0184085 A1 | * | 10/2003 | Thompson | F16L 21/002 285/92 |

FOREIGN PATENT DOCUMENTS

| | | | | |
|---|---|---|---|---|
| WO | WO 2010/083157 | * | 7/2010 | ............ B65D 83/76 |
| WO | WO-2010083157 A2 | | 7/2010 | |

OTHER PUBLICATIONS

Pagina et al. "-691-1 692-1 Codice componente-LT-P" Jan. 2, 2011 retrieved from the Internet URL http://us.misumi.com retrieved Jun. 25, 2017.( searched rolled ball screw block nut/thread diameter 15,20 or 25 lead 5 or 10, precision grade c10).*

(Continued)

*Primary Examiner* — Joseph J Hail
*Assistant Examiner* — Shantese McDonald
(74) *Attorney, Agent, or Firm* — Marshall, Gerstein & Borun LLP (57) ABSTRACT

A tool for inserting a flame arrestor assembly into a process control device having a first passageway of a first depth and a second passageway of a second depth different from the first depth. The tool includes a head portion having a first diameter, and a tip portion having a second diameter less than the first diameter. The tip portion has a first portion, a second portion, and a third portion, the first and second portions being separated by a first notch, and the second and third portions being separated by a second notch. The first notch is arranged to indicate when the flame arrestor assembly is fully inserted into the first passageway, and the second notch is arranged to indicate when the flame arrestor assembly is fully inserted into the second passageway.

20 Claims, 10 Drawing Sheets

(56) References Cited

OTHER PUBLICATIONS

International Search Report and Written Opinion for PCT/US2016/039155, dated Jan. 16, 2017.
Pagina et al., "-691 1 -692 1 Codice componente -LF-P", Jan. 2, 2011, Retrieved from the Internet: URL:http://it.misumi-ec.com/pdf/fa/2014/P10691-0692_F10_IT.pdf, retrieved on Sep. 22, 2016, p. 1.

* cited by examiner

000
TOOL FOR INSERTING COMPONENTS OF A FLAME ARRESTOR ASSEMBLY INTO A PROCESS CONTROL DEVICE

FIELD OF THE INVENTION

The present disclosure is directed to a tool for flame arrestor assemblies, and, more particularly, to a tool for inserting components of a flame arrestor assembly into fluid flow passageways of a process control device having different depths.

BACKGROUND

Process control devices, e.g., valve controllers, may be operated in environments that are susceptible to explosions or fires. For example, valve controllers may control valves that control oil flow in a refinery or the flow of chemicals in a chemical plant or manufacturing facility. Valve controllers typically include modules having an enclosure that may accumulate fluids and/or gases from the potentially combustible environments. Sparks or overheating by electronics, wiring, or motors within the modules may ignite a fluid inside the module and initiate a flame, a fire, or an explosion. Because, in many cases, the modules include passages or channels that enable a fluid to flow between the outside of the enclosure or housing and the inside of the enclosure or housing to enable electronics of the module to measure properties of the fluid, there exists the risk that a flame, a fire, or an explosion initiated within the module will spread, via the passages or channels, to the potentially combustible environment outside the module.

To prevent such a flame, fire, or explosion from spreading from the module to the potentially combustible outside environment, a flame arrestor may be disposed within a channel or a passage of the module. A flame arrestor permits fluid to flow through the channel or passage and, at the same time, prevents (e.g., extinguishes) a flame, a fire, or an explosion from reaching the outside environment by absorbing heat associated with the flame, fire, or explosion. In other words, the flame arrestor enables a fluid to enter the module from the outside environment while preventing a fire or explosion from exiting a housing or enclosure of the module and igniting the outside environment.

Pursuant to ASME standards, a flame arrestor needs to be secured, in some manner, within the channel or passage of the module. In other words, a flame arrestor cannot rely on an interface fit (i.e., a press fit) to prevent displacement relative to the channel or passage of the module.

SUMMARY

In accordance with one exemplary aspect of the present invention, a tool is provided for inserting a flame arrestor assembly into a process control device having a first passageway of a first depth and a second passageway of a second depth different from the first depth. The tool includes a head portion having a first diameter, and a tip portion having a second diameter less than the first diameter. The tip portion has a first portion, a second portion, and a third portion, the first and second portions being separated by a first notch, and the second and third portions being separated by a second notch. The first notch is arranged to indicate when the flame arrestor assembly is fully inserted into the first passageway, and the second notch is arranged to indicate when the flame arrestor assembly is fully inserted into the second passageway.

In accordance with another exemplary aspect of the present invention, a tool is provided for inserting a flame arrestor assembly into a process control device having a first passageway of a first depth and a second passageway of a second depth different from the first depth. The tool includes a head portion having a first diameter, and a tip portion having a second diameter less than the first diameter. The tip portion has a first portion and a second portion, the first portion having a first length selected based on the first depth, the second portion having a second length selected based on the second depth.

In accordance with another exemplary aspect of the present invention, an assembly is provided for inserting a flame arrestor assembly into a process control device having a first passageway of a first depth and a second passageway of a second depth different from the first depth. The assembly includes a tool and a guide element. The tool includes a head portion having a first diameter, and a tip portion having a second diameter less than the first diameter. The tip portion has a first portion and a second portion, the first portion having a first length selected based on the first depth, the second portion having a second length selected based on the second depth. The guide element has a base, a collar extending outward from the base, and a guide bore extending through the base and the collar. The collar has a threaded portion arranged to engage a corresponding threaded portion of the first or second passageway, and the guide bore is sized to receive the tip portion of the tool, thereby guiding the tool into the first or second passageway.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

Figure 1:
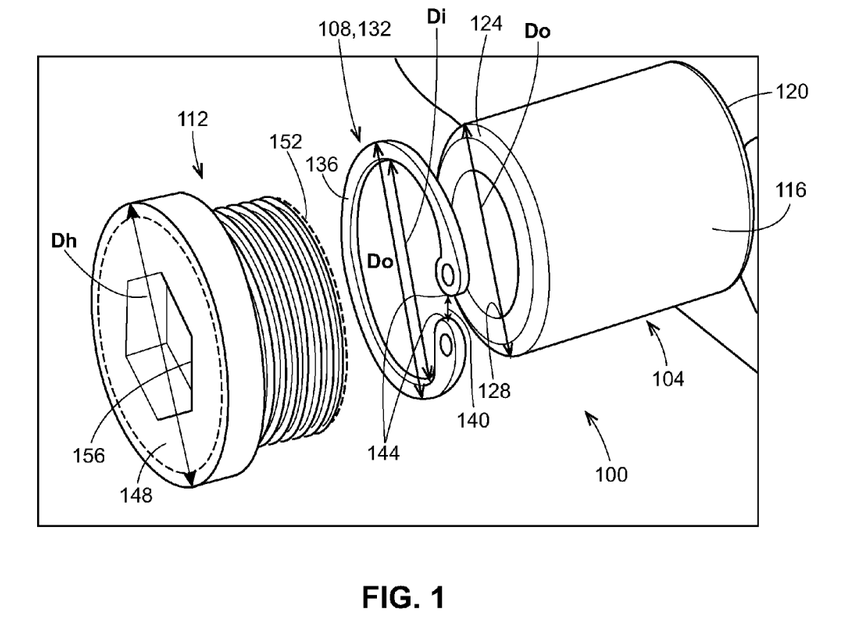
FIG. 1 is a perspective view of one example of a flame arrestor assembly.

FIG. 1 illustrates one example of a flame arrestor assembly 100 that can be utilized or employed with any number of process control devices, e.g., valve controllers, as will be described in greater detail below. Once arranged (e.g., installed) in a process control device, the flame arrestor assembly 100 permits fluid to flow through a channel or passage of that process control device and, at the same time, prevents a flame, a fire, or an explosion from propagating between the process control device and an environment outside of the process control device. Accordingly, the flame arrestor assembly 100 prevents a flame, a fire, or an explosion from exiting the process control device and igniting the outside environment.

As illustrated in FIG. 1, the flame arrestor assembly 100 in this example includes a flame arrestor 104, a retaining element 108, and a plug 112. In other examples, the flame arrestor assembly 100 can include more or less components. As an example, the plug 112 need not be part of the flame arrestor assembly 100. Moreover, it will be appreciated that the retaining element 108 can be integrally formed with, rather than structurally separate from, the flame arrestor 104. As an example, the retaining element 108 can be built into the side of the flame arrestor 104.

The flame arrestor 104, which can also be referred to as a filter, has a cylindrical body 116 made of any suitable material, such as, for example, a sintered material (e.g., stainless steel). The cylindrical body 116 has a first end 120 and a chamfered second end 124 opposite the first end 120. A passage 128 is defined between the first and second ends 120, 124 and through the body 116, thereby permitting fluid flow through the flame arrestor 104.

The retaining element 108 is generally sized and shaped to retain the flame arrestor 104 in position, once arranged or disposed in a process control device, as will be described in greater detail below. In the illustrated example, the retaining element 108 takes the form of a snap ring 132. The snap ring 132 has a substantially annular body 136 and a small gap 140 formed between opposing ends 144 of the annular body 136. As illustrated, the ends 144 are slightly wider than the rest of the body 136. The snap ring 132 has an outer diameter $D_o$ that is greater than an outer diameter $D_o$ of the body 116 and an inner diameter $D_i$ that is less than the outer diameter $D_o$ of the body 116.

The plug 112 illustrated in FIG. 1 is an NPT plug having a cylindrical head portion 148, a threaded body portion 152, and a passage 156 defined through the head and body portions 148, 152 (though difficult to see in FIG. 1). The head portion 148 has a diameter $D_h$ that is larger than the outer diameter $D_o$ of the body 116 of the flame arrestor 104. The threaded body portion 152, meanwhile, has a diameter $D_b$ that is smaller than the diameter $D_h$ of the head portion 148 but slightly larger than the outer diameter $D_o$ of the body 116 of the flame arrestor 104. As will be described in greater detail below, the threaded body portion 152 is generally configured to thread the plug 112 to the process control device utilizing the flame arrestor assembly 100.

In other examples, the flame arrestor assembly 100 can vary from what is illustrated in FIG. 1. More specifically, the flame arrestor 104, the retaining element 108, and/or the plug 112 can vary in shape, size, and/or construction. As an example, the body 116 of the flame arrestor 104 can have a larger or smaller diameter, based, for example, on the process control device that employs the flame arrestor 104. Likewise, the snap ring 132 can have a larger or smaller diameter, based, for example, on the process control device that employs the flame arrestor assembly 100 and/or the outer diameter $D_o$ of the flame arrestor 104. As another example, the retaining element 108 can have a differently shaped body (e.g., a rectangular body) than the body 116. Moreover, in some examples, the retaining element 108 can take on a different form than the snap ring 132 (e.g. a threaded plug with a through hole or a spacer of sorts that is disposed between the flame arrestor 104 and the plug 112). Further, the plug 112 can, in other examples, take the form of a press-fit plug with a retaining method, a plug that is staked in place, or some other type of plug.

Figure 2:
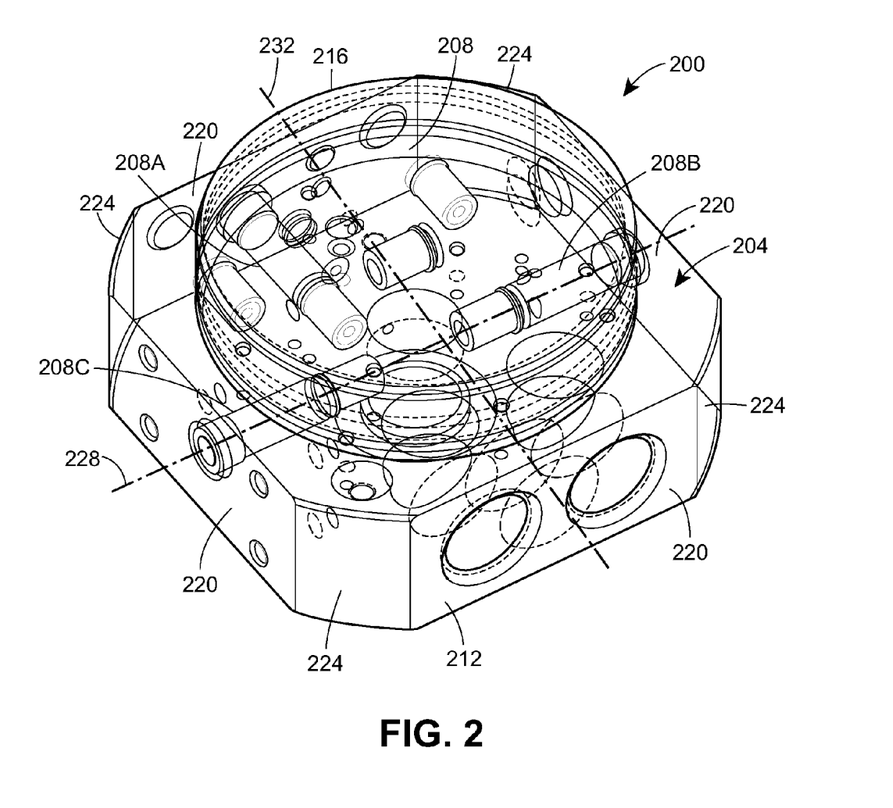
FIG. 2 is a perspective, transparent view of one example of a process control device constructed to accommodate one or more of the flame arrestor assemblies illustrated in FIG. 1.

FIG. 2 illustrates one example of a process control device 200 constructed to accommodate a plurality of the flame arrestor assemblies 100 described above. The process control device 200 illustrated in FIG. 2 takes the form of a valve controller (e.g., the TESCOM™ ER3000 or ER5000 controller) that includes a housing or enclosure 204 and a plurality of fluid flow passageways 208 formed or defined in the housing 204. For clarity purposes, only some of the fluid flow passageways 208 are referenced in FIG. 2. The valve controller is, as is generally known in the art, configured to monitor and/or control the position of a valve. Thus, it will be appreciated that the process control device 200 may also include sensors, electrical circuitry, amplifiers, converters, and/or other electrical components arranged in and/or on the housing 204, such that the process control device 200 can operate as intended.

As illustrated in FIG. 2, the housing 204 includes a base 212 and a cap 216 that is secured to and extends outward (in this case upward) from the base 212. The base 212 has a substantially rectangular shape defined by four rectangular (i.e., flat) walls 220 and four curved walls 224 extending between adjacent rectangular walls 220.

With reference still to FIG. 2, the fluid flow passageways 208 are formed or defined in the base 212 of the housing 204. Each fluid flow passageway 208 extends between one of the walls 220 of the base 212 and an interior portion of the base 212. Each of the fluid flow passageways 208 thus enables fluid communication between the process control device 200 (e.g., the electrical components of the process control device 200) and the environment outside of the process control device 200. While each fluid flow passageway 208 extends along or is parallel to an axis 228 or an axis 232, which is perpendicular to the axis 228, one or more fluid flow passageways 208 can, in other examples, extend along a different axis (e.g., an axis oriented at an angle to the axis 228 or the axis 232).

Figure 3A:
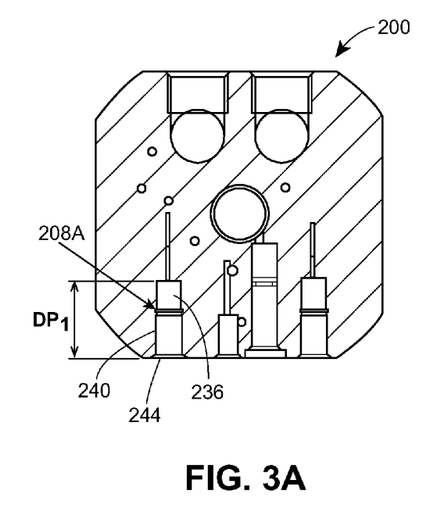
FIG. 3A is a cross-sectional view of the process control device of FIG. 2, taken along line 3A-3A in FIG. 2.
Figure 3B:
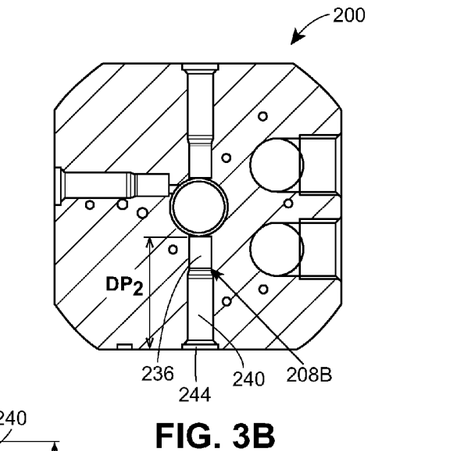
FIG. 3B is a cross-sectional view of the process control device of FIG. 2, taken along line 3B-3B in FIG. 2.
Figure 3C:
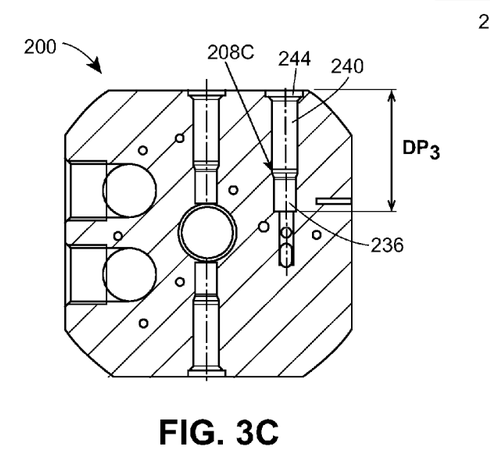
FIG. 3C is a cross-sectional view of the process control device of FIG. 2, taken along line 3C-3C in FIG. 2.

In some cases, the process control device 200 can include fluid flow passageways 208 of or having different depths. As illustrated in FIGS. 3A, 3B, and 3C, the process control device 200 can include a first fluid flow passageway 208A of or having a first depth $DP_1$, a second fluid flow passageway 208B of or having a second depth $DP_2$ different from the first depth $DP_1$, and a third fluid flow passageway 208C of or having a third depth $DP_3$ different from the first and second depths $DP_1$, $DP_2$. In this example, the second depth $DP_2$ is greater than the first depth $DP_1$, and the third depth $DP_3$ is greater than each of the first and second depths $DP_1$, $DP_2$. As an example, the first depth $DP_1$ may be approximately 26.5 mm (or approximately 1.043 in.), the second depth $DP_2$ may be approximately 37.5 mm (or approximately 1.476 in.), and the third depth $DP_3$ may be approximately 40 mm (or approximately 1.575 in.). In other examples, however, the first, second, and third depths $DP_1$, $DP_2$, $DP_3$ can vary (e.g., the second depth $DP_2$ than be less than the first depth $DP_1$, etc.). Moreover, in other examples, the process control device 200 can include more or less different depths (e.g., can include passageways of equal depth, passageways having two different depths, can include passageways having four different depths, etc.).

Figure 4:
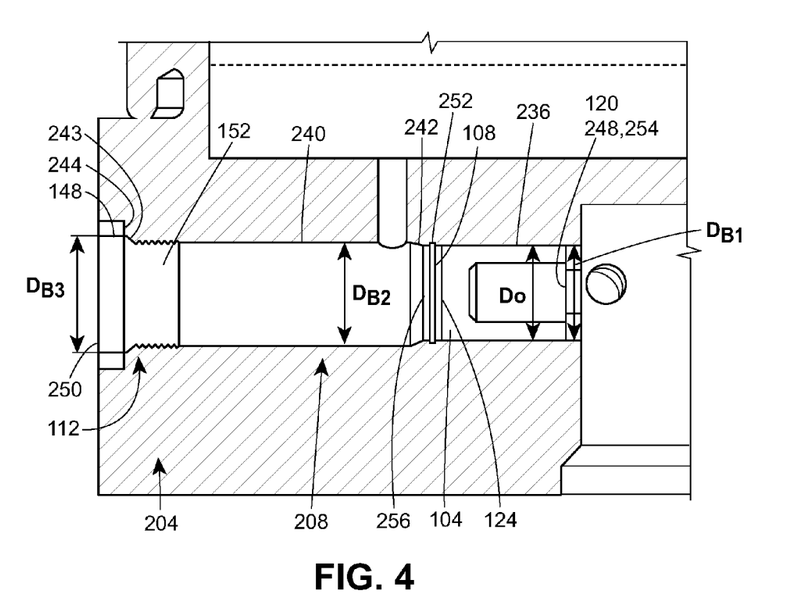
FIG. 4 is a cross-sectional view of a portion of the process control device of FIG. 2, showing the flame arrestor assembly of FIG. 1 arranged in a fluid flow passageway of the process control device of FIG. 2.
Figure 5:
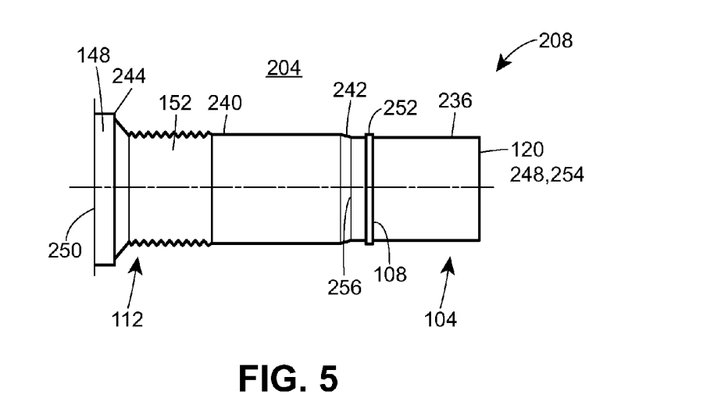
FIG. 5 is similar to FIG. 4, but is a line drawing of the flame arrestor assembly of FIG. 1 arranged in a fluid flow passageway of the process control device of FIG. 2.

Each of the fluid flow passageways 208 (including the passageways 208A, 208B, 208C) is configured to accommodate one of the flame arrestor assemblies 100 discussed above. To this end, each fluid flow passageway 208, regardless of depth, includes or is defined by a first bore 236, a second bore 240, a first chamfer 242, a second chamfer 243, and a third bore 244, as illustrated in FIGS. 4 and 5. Of course, it will be understood that the depths of the first bore 236, the second bore 240, and/or the third bore 244 will vary depending upon the desired depth of the respective fluid flow passageway 208. The first bore 236, which extends between a first end 248 of the fluid flow passageway 208 and the chamfer 242, has a first diameter $D_{B1}$ substantially equal to the outer diameter $D_o$ of the body 116 of the flame arrestor 104, such that the first bore 236 is configured to receive one of the flame arrestors 104. As an example, the first diameter $D_{B1}$ may be approximately 5/16". The second bore 240, which extends between the chamfer 242 and the third bore 244, has a second diameter $D_{B2}$ that is larger than the first diameter $D_{B1}$ of the first bore 236. The second diameter $D_{B2}$ is substantially equal to the diameter $D_b$ of the body portion 152 of the plug 112 and at least a portion of the second bore 240 is threaded, such that the second bore 240 is configured to receive and threadingly retain the threaded body portion 152 of the plug 112 therein. As an example, the threaded portion of the second bore 240 may have a thread size of 1/8" NPT, with the second diameter $D_{B2}$ being in a range between approximately 0.323" and 0.337". The chamfer 242 connects the first bore 236 to the second bore 240 and generally serves to facilitate installation of the flame arrestor 104 and the retaining element 108 within the fluid flow passageway 208. In this example, the chamfer 242 has an angle of approximately 15 degrees, though in other examples, the angle can be approximately 10 degrees, approximately 20 degrees, approximately 30 degrees, or some other angle within a range of approximately 10 degrees to 30 degrees. The third bore 244 extends between the second bore 240 and a second end 250 of the fluid flow passageway 208. The third bore 244 has a third diameter $D_{B3}$ that is larger than the first and second diameters $D_{B1}$, $D_{B2}$ of the first and second bores 236, 240, respectively, and equal to or larger than the diameter $D_h$ of the head portion 148 of the plug 112, such that the third bore 244 can receive the head portion 148 of the plug 112.

The process control device 200 also includes a circumferential groove 252 formed along each of the fluid flow passageways 208. As illustrated in FIGS. 4 and 5, each groove 252 is formed along the first bore 236, between first and second ends 254, 256 of the first bore 236, and proximate to the chamfer 242 (and thus proximate to the second bore 240). More specifically, each groove 252 is formed proximate to the second end 256 of the first bore 236, immediately adjacent the chamfer 242. Each groove 252 is, at least in this example, oriented or extends substantially perpendicular (e.g., perpendicular) to the axes 228, 232. Each groove 252 is arranged to receive and retain one of the retaining elements 108 therein, thereby positioning the retaining element 108 to retain the flame arrestor 104 within the respective fluid flow passageway 208 (and, more particularly, within the first bore 236 of the respective fluid flow passageway 208).

It will be appreciated that the process control device 200 can vary and yet still accommodate one or more of the flame arrestor assemblies 100, as desired. While the process control device 200 described herein takes the form of a valve controller, the process control device can, in other examples, take the form of an electronic heat controller or any other process control device suitable for a given application. Moreover, the process control device 200 can, in other examples, vary in shape, size, and/or construction. The housing 204 can vary in shape, size, and/or construction. The process control device 200 can, in some examples, include a different number of fluid flow passageways 208 (e.g., only one fluid flow passageway) and/or one or more of the fluid flow passageways 208 can be defined differently. As examples, one or more of the fluid flow passageways 208 need not include the third bore 244, the first and second bores 236, 240 can have different diameters than the bores 236, 240 illustrated in FIGS. 4 and 5 (e.g., the first and second bores 236, 240 can have the same diameter), and/or the second bore 240 need not be threaded (but could retain the plug 112 in a different way). Furthermore, while the groove 252 is formed along the first bore 236 at a position proximate to the chamfer 242 and is configured to receive and retain the snap ring 132, the groove 252 can, in other examples, be formed at a different position and/or sized to receive and retain a different retaining element 108.

Figure 6A:
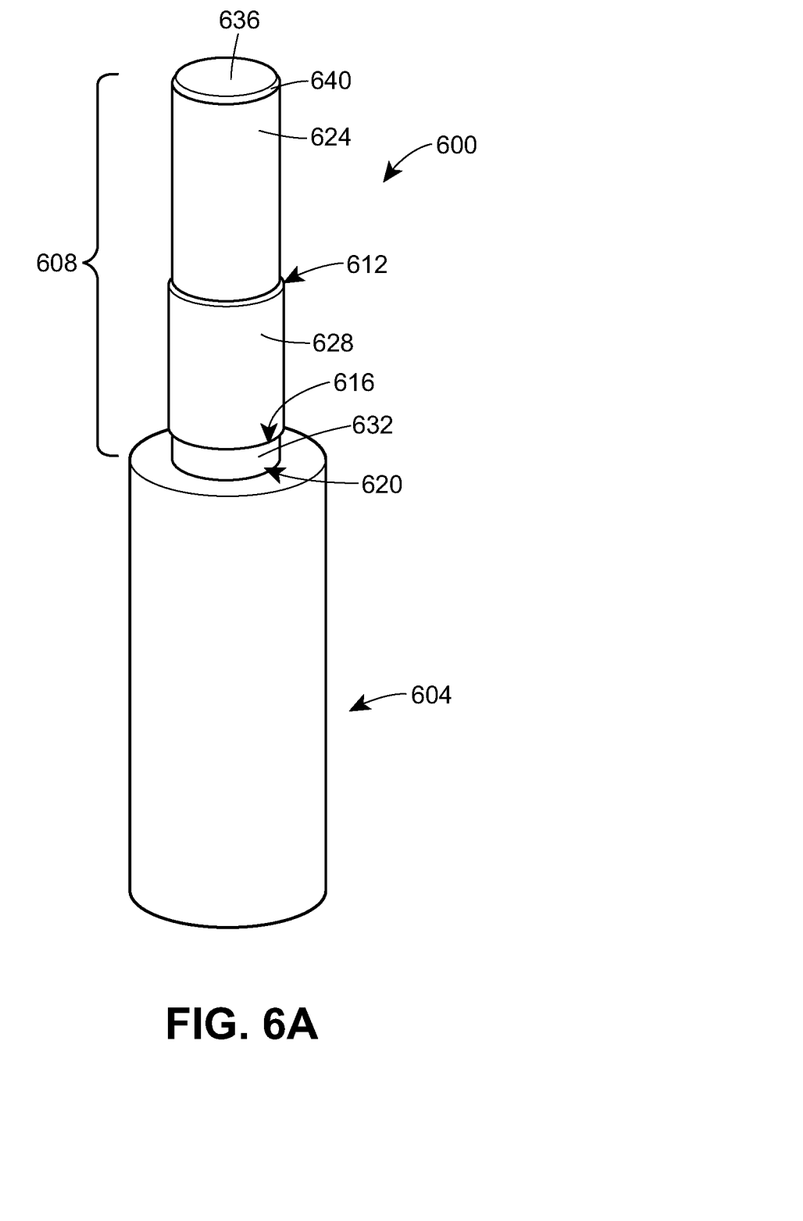
FIG. 6A is a perspective view of one example of a tool constructed in accordance with the teachings of the present invention and configured to facilitate insertion of the flame arrestor assembly of FIG. 1 into the process control device of FIG. 2.
Figure 6B:
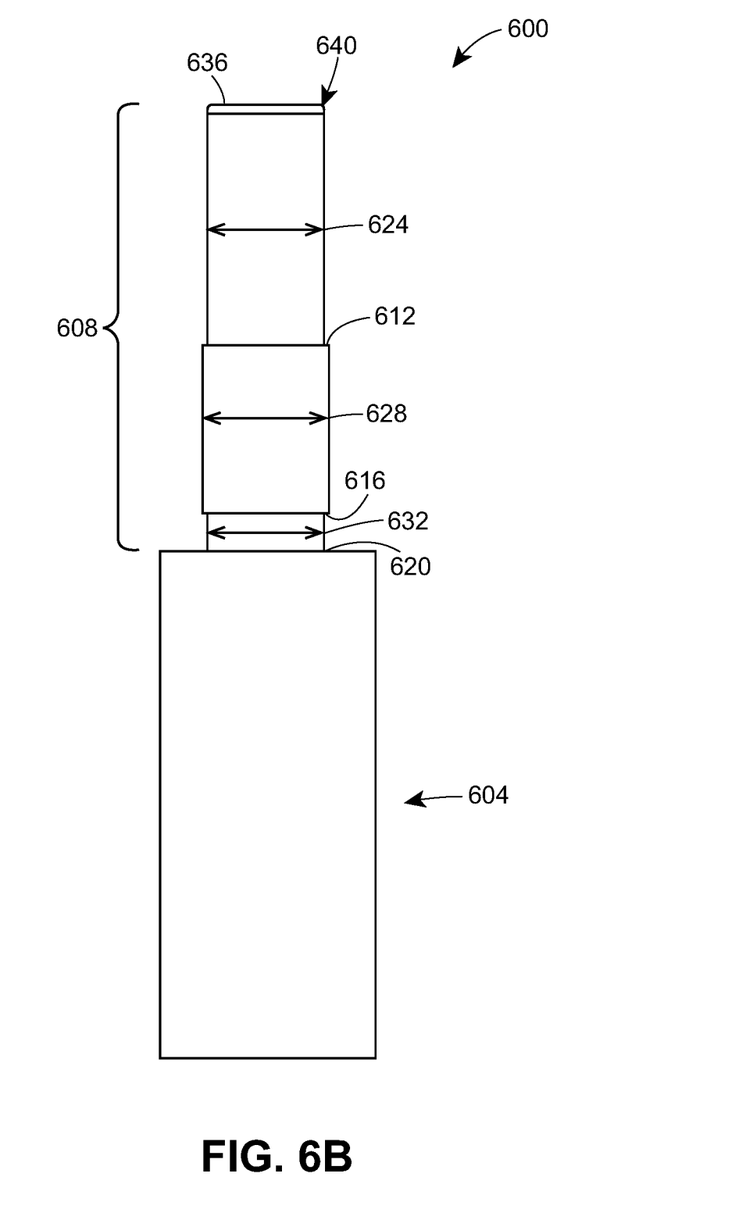
FIG. 6B is a front, plan view of the tool shown in FIG. 6A.

FIGS. 6A and 6B illustrate one example of a tool 600 that can be used to fully insert (e.g., press-fit) the flame arrestor 104 and the retaining element 108, either at the same time or at different times, into any of the passageways 208 (e.g., the passageways 208A, 208B, 208C) of the process control device 200. Stated another way, the same tool—the tool 600—can be used to fully insert the flame arrestor 104 and the retaining element 108, either at the same time or at different times, into or at different depths within the process control device 200. More specifically, the same tool—the tool 600—can be used to fully insert the flame arrestor 104 and the retaining element 108 into a fluid flow passageway 208 having or of a first depth (e.g., the passageway 208A), a fluid flow passageway 208 having or of a second depth (e.g., the passageway 208B), and a fluid flow passageway 208 having or of a third depth (e.g., the passageway 208C).

The tool 600 illustrated in FIGS. 6A and 6B is made of Stainless Steel (e.g., 17-4 Stainless Steel, tool hardened steel), though it can instead be made of Nylon, another metal (e.g., a different type of Stainless Steel), or any other suitable material. The tool 600 has a head portion 604 and a tip portion 608 extending outward from the head portion 604.

The head portion 604 has a larger diameter and has a longer length than the tip portion 608 (and the various portions therein), at least in this example. The tool 600 illustrated in FIGS. 6A and 6B also includes three notches 612, 616, 620 arranged or positioned to correspond to the depths $DP_1$, $DP_2$, and $DP_3$, respectively, of the fluid flow passageways 208A, 208B, 208C, such that the notches 612, 616, 620 allow a user of the tool 600 to quickly and easily determine whether the flame arrestor 104 and/or the retaining element 108 is/are fully inserted (e.g., pressed) into the passageways 208A, 208B, 208C, respectively. The first notch 612 is arranged to provide an indication (e.g., visual feedback) of whether the flame arrestor 104 and/or the retaining element 108 is/are fully inserted (e.g., pressed) into the passageway 208A (which has the depth of $DP_1$), the second notch 616 is arranged to provide an indication (e.g., visual feedback) of whether the flame arrestor 104 and/or the retaining element 108 is/are fully inserted (e.g., pressed) into the passageway 208B (which has the depth of $DP_2$), and the third notch 620 is arranged to provide an indication (e.g., visual feedback) of whether the flame arrestor 104 and/or the retaining element 108 is/are fully inserted (e.g., pressed) into the passageway 208C (which has the depth of $DP_3$), as will be discussed in greater detail below.

With reference still to FIGS. 6A and 6B, the tip portion 608 has a first portion 624, a second portion 628, and a third portion 632. The first portion 624 is defined by and extends between a first end 636 of the tool 600 and the first notch 612, which is formed in the tip portion 608. The first portion 624 also includes a chamfer 640 formed or arranged at the first end 636 of the tool 600. In this example, the chamfer 640 has an angle of approximately 60 degrees, though in other examples, the angle can be approximately 10 degrees, approximately 20 degrees, approximately 30 degrees, or some other angle. The second portion 628 is defined by and extends between the first notch 612 and the second notch 616, which is formed in the tip portion 608 at a position closer to the head portion 604 than the first notch 612. The third portion 632 is defined by and extends between the second notch 616 and the third notch 620, which is formed at the intersection between the head and tip portions 604, 608, as shown.

The first portion 624 has a length that is greater than each of a length of the second portion 628 and a length of the third portion 632, while the length of the second portion 628 is greater than the length of the third portion 632. As an example, the first portion 624 can have a length of approximately 16 mm (or approximately 0.63 in.), the second portion 628 can have a length of approximately 11 mm (or approximately 0.433 in.), and the third portion can have a length of approximately 2.5 mm (or approximately 0.10 in.). In other examples, however, the lengths of the first, second, and third portions 624, 628, 632, can vary depending upon, for example, the depths of the fluid flow passageways 208.

Figure 7:
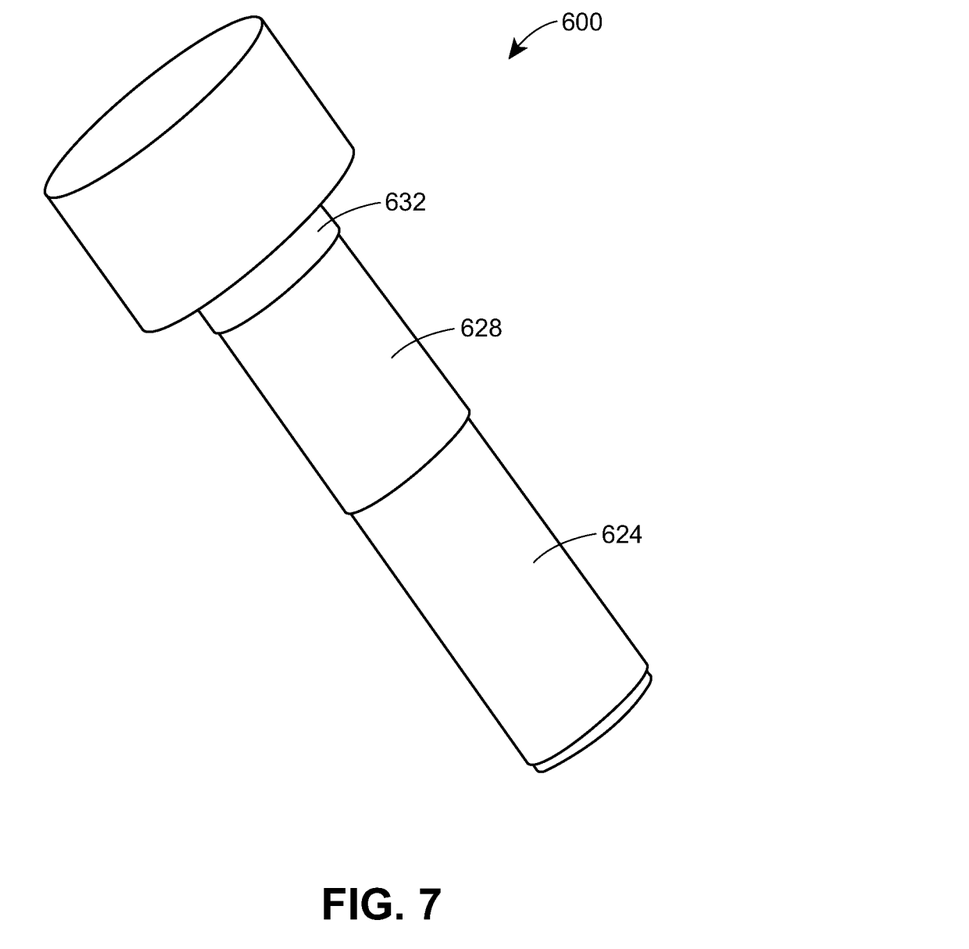
FIG. 7 is a perspective view of another example of a tool constructed in accordance with the teachings of the present invention and configured to facilitate insertion of the flame arrestor assembly of FIG. 1 into the process control device of FIG. 2.

The second portion 628 has a diameter that is larger than each of a diameter of the first portion 624 and a diameter of the third portion 632, while the diameter of the first portion 624 is equal to the diameter of the third portion 632. As an example, the second portion 628 can have a diameter of approximately 8.25 mm (or 0.325 in.), while each of the first and third portions 624, 632 can have a diameter of approximately 7.75 mm (or 0.305 in.). In other examples, however, the diameters of the first, second, and/or third portions 624, 628, 632 can vary, depending upon, for example, the diameters of the fluid flow passageways 208. For example, as illustrated in FIG. 7, the diameters of the first, second, and third portions 624, 628, 632 can be equal to one another. As another example, the diameter of the first portion 624 need not be equal to the diameter of the third portion 632.

While the tool 600 is described as being used to insert components of the flame arrestor assembly 100 into the process control device 200, it will be appreciated that the tool 600 can be used to insert components of a different flame arrestor assembly and/or other press-fit object into the process control device 200. Moreover, while the tool 600 is described as being configured to insert components of the flame arrestor assembly 100 into the various fluid flow passageways 208 of the process control device 200, which can have or be of different depths, it will be appreciated that the tool 600 can be configured to insert components of the flame arrestor assembly 100 into various depths of another process control device and/or other device. Furthermore, the tool 600 can, in some cases, be constructed to withstand a pre-determined force; when a force in excess of this pre-determined force is applied to the tool 600, the tool 600 can be configured to fail, much like a torque wrench. This can serve to prevent excess forces from being applied to components of the flame arrestor assembly 100, which would cause these components to fail.

Though not illustrated herein, the tool 600 is configured for use with a press (e.g., an arbor press). Once the tool 600 is coupled (e.g., mounted) to the press, the tool 600 can be used to fully insert the flame arrestor 104 and/or the retaining element 108 in any one of the fluid flow passageways 208A, 208B, 208C, which have different depths, as discussed above. In some cases, the tool 600 can be used to fully insert the flame arrestor 104 or the retaining element 108 one at a time, while in other cases, the tool 600 can be used to fully insert the flame arrestor 104 and the retaining element 108 at the same time (i.e., as part of the same operation).

When, for example, it is desired to insert the flame arrestor 104 into the fluid flow passageway 208A, the tool 600, when driven by the press, forces the flame arrestor 104 into the fluid flow passageway 208A via the third bore 244, into and through the second bore 240, and into the first bore 236, at which point the first portion 624 of the tool 600 will be arranged within the second bore 240 and the third bore 244. At this point, an end user of the press (and the tool 600) can use the position of first notch 612 to determine whether the flame arrestor 104 is fully inserted into the fluid flow passageway 208A (i.e., the flame arrestor 104 is seated against the first end 248 of the fluid flow passageway 208A). If the first notch 612 is aligned with the second end 250 of the fluid flow passageway 208A, this indicates to the end user that the flame arrestor 104 is fully inserted into the fluid flow passageway 208A. If, on the other hand, the first notch 612 is positioned at a distance (even a small distance) from (and outward of) the second end 250 of the fluid flow passageway 208A, this indicates to the end user that the flame arrestor 104 is not yet fully inserted into the fluid flow passageway 208A, and the flame arrestor 104 is to be driven further within the fluid flow passageway 208A until fully inserted therein.

When, as another example, it is desired to insert the flame arrestor 104 into the fluid flow passageway 208B, which has a different depth than the fluid flow passageway 208A, the same tool 600 can be used. Much like above, the tool 600, when driven by the press, forces the flame arrestor 104 into the fluid flow passageway 208B via the third bore 244, into and through the second bore 240, and into the first bore 236, at which point the first and second portions 624, 628 of the tool 600 will be arranged within the second and third bores 640, 644. At this point, an end user of the press can use the position of the second notch 616 to determine whether the flame arrestor 104 is fully inserted into the fluid flow passageway 208B (i.e., the flame arrestor 104 is seated against the first end 248 of the fluid flow passageway 208B). If the second notch 616 is aligned with the second end 250 of the fluid flow passageway 208B, this indicates to the end user that the flame arrestor 104 is fully inserted into the fluid flow passageway 208B. If, on the other hand, the second notch 616 is positioned at a distance (even a small distance) from (and outward of) the second end 250 of the fluid flow passageway 208B, this indicates to the end user that the flame arrestor 104 is not yet fully inserted into the fluid flow passageway 208B, and the flame arrestor 104 is to be driven further within the fluid flow passageway 208B until fully inserted therein.

Similarly, when it is desired to insert the flame arrestor 104 into the fluid flow passageway 208C, which has a different depth than the fluid flow passageways 208A, 208B, the same tool 600 can be used. Much like above, the tool 600, when driven by the press, forces the flame arrestor 104 into the fluid flow passageway 208C via the third bore 244, into and through the second bore 240, and into the first bore 236, at which point the first, second, and third portions 624, 628, 632 of the tool 600 will be arranged within the second and third bores 640, 644. At this point, an end user of the press can use the position of the third notch 620 to determine whether the flame arrestor 104 is fully inserted into the fluid flow passageway 208C (i.e., the flame arrestor 104 is seated against the first end 248 of the fluid flow passageway 208C). If the third notch 620 is aligned with the second end 250 of the fluid flow passageway 208C, this indicates to the end user that the flame arrestor 104 is fully inserted into the fluid flow passageway 208C. If, on the other hand, the third notch 620 is positioned at a distance (even a small distance) from (and outward of) the second end 250 of the fluid flow passageway 208C, this indicates to the end user that the flame arrestor 104 is not yet fully inserted into the fluid flow passageway 208C, and the flame arrestor 104 is to be driven further within the fluid flow passageway 208C until fully inserted therein.

In a similar manner, the tool 600 can be used to insert the retaining element 108 into any of the fluid flow passageways 208A, 208B, 208C. The retaining element 108 is inserted into the desired fluid flow passageway 208A, 208B, 208C until the retaining element 108 reaches the circumferential groove 252 of the respective fluid flow passageway 208A, 208B, 208C. At this point, the retaining element 108, which has a diameter larger than the first bore 236, expands, filling the groove 252. In other words, the retaining element 108 snaps into place within the groove 252. So arranged, the retaining element 108, by virtue of having an inner diameter $D_i$ that is less than the outer diameter $D_o$ of the body 116, serves to securely retain the flame arrestor 104 within the desired fluid flow passageway 208A, 208B, 208C.

Finally, the plug 112, which need not be considered part of the flame arrestor assembly 100, can be inserted (e.g., by hand, using the tool 600) into the fluid flow passageway 208 via the third bore 244. The threaded body portion 152 of the plug 112 is threaded to and within the second bore 240, while the head portion 148 of the plug 112 is arranged or disposed within the third bore 244.

Figure 8A:
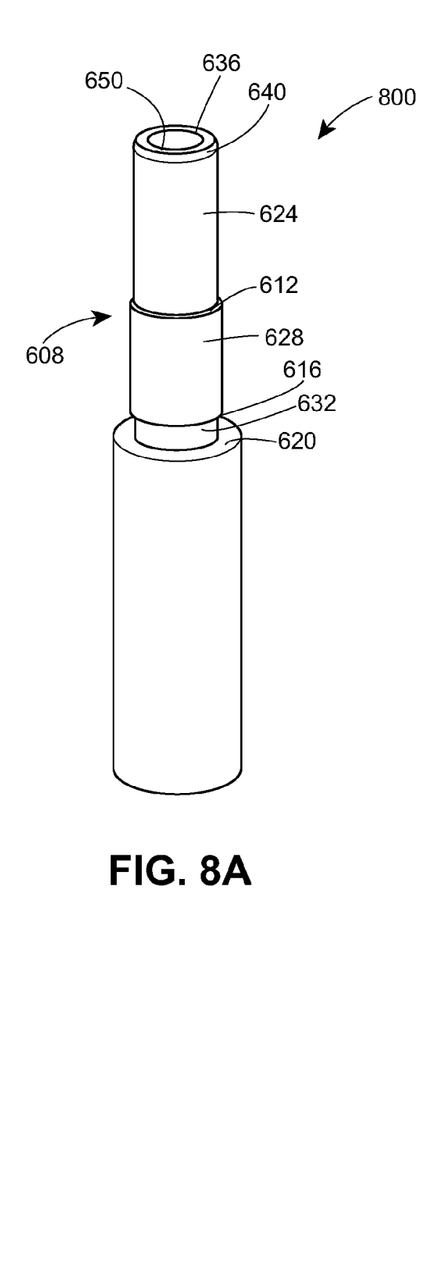
FIG. 8A is a perspective view of another example of a tool constructed in accordance with the teachings of the present invention and configured to facilitate insertion of the flame arrestor assembly of FIG. 1 into the process control device of FIG. 2.
Figure 8B:
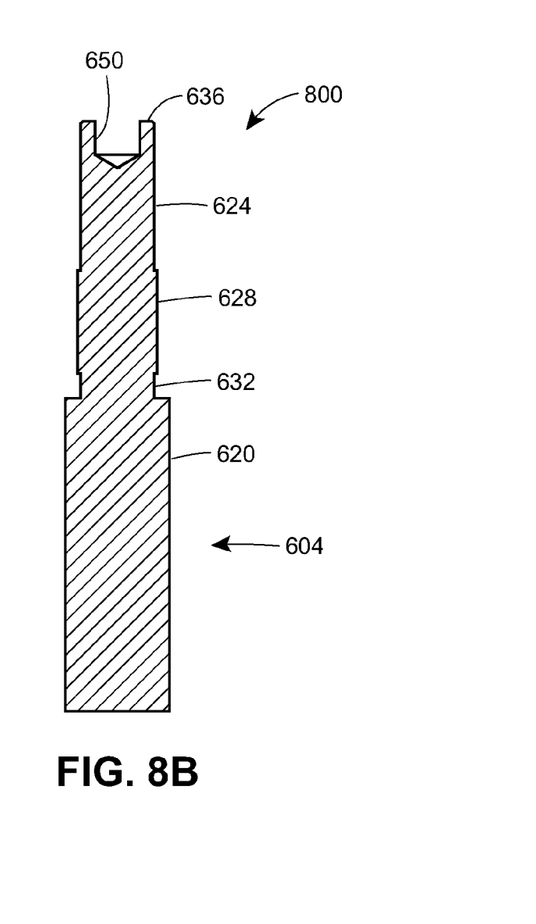
FIG. 8B is a cross-sectional view of the tool of FIG. 8A.

FIGS. 8A and 8B illustrate another example of a tool 800 that can be used instead of the tool 600 to fully insert (e.g., press-fit) the flame arrestor 104 and the retaining element 108, either at the same time or at different times, into any of the passageways 208 of the process control device 200. The tool 800 is substantially similar to the tool 600, with common reference numerals used for common components, but also includes a bore 650 that is formed or defined at the first end 636 and partially extends through the first portion 624 of the tip portion 608. The bore 650 aims to help reduce, if not prevent, compression of the flame arrestor 104 that may otherwise occur during insertion as a result of the tight-press fit between the flame arrestor 104 and the respective passageway 208 (which would in turn reduce fluid flow through the flame arrestor 104).

Figure 9A:
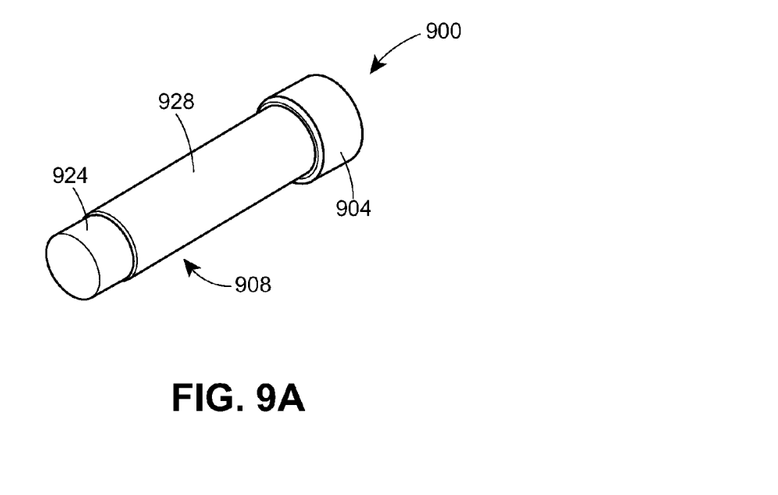
FIG. 9A is a perspective view of another example of a tool constructed in accordance with the teachings of the present invention and configured to facilitate insertion of the flame arrestor assembly of FIG. 1 into the process control device of FIG. 2.
Figure 9B:
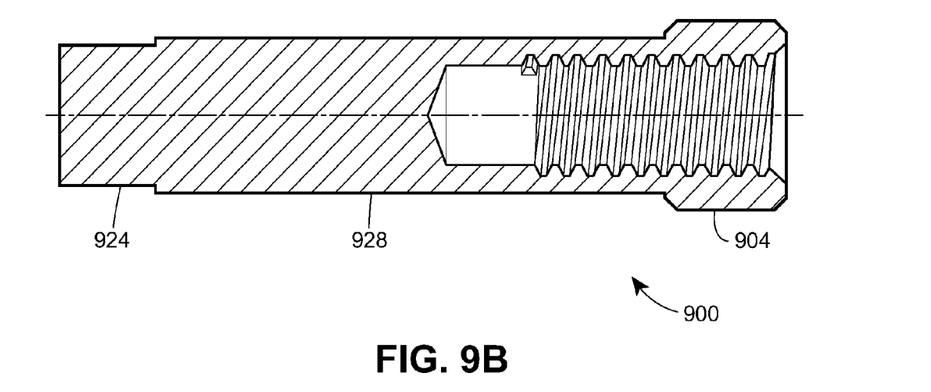
FIG. 9B is a cross-sectional view of the tool of FIG. 9A.

FIGS. 9A and 9B illustrate another example of a tool 900 that can be used instead of the tool 600 (or the tool 700) to fully insert (e.g., press-fit) the flame arrestor 104 and the retaining element 108, either at the same time or at different times, into any of the passageways 208 of the process control device 200. The tool 900 is similar to the tool 600, but the tool 900 has a tip portion 908 that has a flat end (i.e., does not include a chamfer like the tool 600), which in some cases may facilitate installation of the retaining element 108. The tip portion 908 only includes two portions (rather than the three portions 624, 628, 632 described in connection with the tool 600)—a first portion 924 and a second portion 928. The first and second portions 924, 928 have different diameters and lengths than the first and second portions 624, 628 (though this need not be the case). In this example, the first portion 924 has a length of approximately 0.20 in. and a diameter of approximately 0.30 in., while the second portion 928 has a length of approximately 1.05 in. and a diameter of approximately 0.32 in. The tool 900 also has a head portion 904 that varies in diameter and length from the head portion 604. The head portion 904 in this example has a length of approximately 0.25 in. and a diameter of approximately 0.38 in. As such, the tool 900 may be used to insert the flame arrestor 104 and the retaining element 108 into passageways 208 of different depths than the tool 600.

Figure 10A:
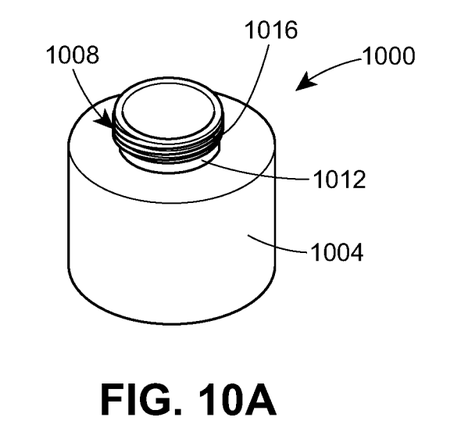
FIG. 10A is a perspective view of a guide element constructed in accordance with the teachings of the present invention that can be used to facilitate usage of the tool of any of FIGS. 6-9.
Figure 10B:
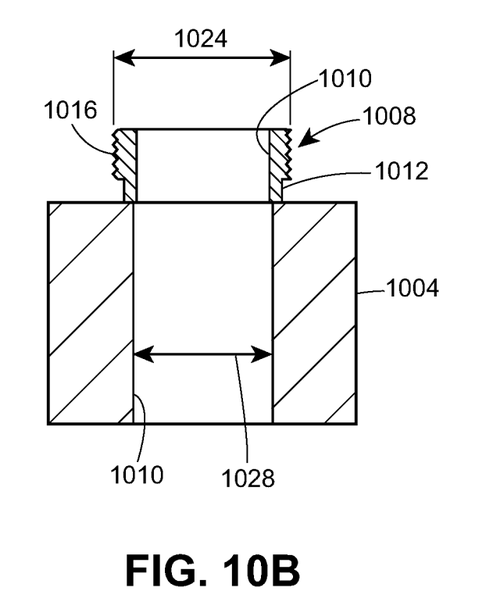
FIG. 10B is a cross-sectional view of the guide element of FIG. 10A.

In some cases, it may prove difficult to fully insert the flame arrestor 104 and the retaining element 108 into one of the passageways 208. FIG. 10 illustrates a guide element 1000 that may be quickly and easily coupled to the process control device 200 to help facilitate insertion in such cases. The guide element 1000 illustrated in FIG. 10 has a cylindrical base 1004, an annular collar 1008 that extends outward (in this case upward) from the base 1004, and a guide bore 1010 that is defined or formed in and through the cylindrical base 1004 and the annular collar 1008. It will be appreciated that the base 1004 has an outer diameter that is larger than the diameter $D_{B3}$ of the third bore 244 of each of the passageways 208. The collar 1008 in this example includes a first portion 1012 and a second portion 1016 that has a larger outer diameter than the first portion 1012, though in other examples, the collar 1008 need not include two different portions or the first and second portions 1012 and 1016 can vary in size. The second portion 1016 of the collar is threaded, i.e., it includes threads 1020, and has an outer diameter 1024 that is smaller than the diameter $D_{B3}$ of the third bore 244 of each of the passageways 208 and is substantially equal to the diameter $D_{B2}$ of the second bore 240. So constructed, the second portion 1016 can be inserted into a respective one of the passageways 208, via the third bore 244, and threaded to the threaded portion of the second bore 240, such that the collar 1008 is substantially, if not entirely, arranged within the passageway 208, and the cylindrical base 1004 is arranged outside of the passageway 208. So arranged, the guide bore 1010 of the guide element 1000, which has a diameter 1028 that is greater than the diameter of any of the above-described portions of the tools 600, 700, and 800, is sized to receive the tool 600, 700, or 800 being used. In turn, the base 1004 and the collar 1008 help to guide (e.g., center) and stabilize the tool 600, 700, and 800 as it is being used to insert the flame arrestor 104 and the retaining element 108. Then, after the flame arrestor 104 and/or the retaining element 108 has/have been inserted, the guide element 1000 can be quickly and easily decoupled from the process control device 200 by unthreading the collar 1008 from the second bore 240.

When the flame arrestor assembly 100 is arranged or disposed in one of the fluid flow passageways 208A, 208B, 208C of the process control device 200, the flame arrestor assembly 100 enables fluid flow between the process control device 200 and the environment outside of the process control device 200, and, simultaneously, prevents a flame, a fire, or an explosion from propagating between the process control device 200 and the environment outside of the process control device 200.

Finally, it will be appreciated that multiple tools 600, 700, or 800 can be used together to insert two or more flame arrestors 104 and/or two or more retaining elements 108 into the same process control device 200 at the same time (i.e., during the same operation).

Based on the foregoing description, it should be appreciated that the present disclosure provides a tool for inserting components of a flame arrestor assembly into a process control device. The tool can be used to insert components into channels or passages of the process control device that have different depths. The tool also includes a plurality of notches that allow an end user of the tool to easily and quickly determine whether the components, when being inserted, have reached the fully inserted position at the various depths.

The invention claimed is:

1. A system, comprising:
    a process control device having a first passageway of a first depth and a second passageway of a second depth different from the first depth;
    a flame arrestor assembly; and
    a tool for inserting the flame arrestor assembly into the process control device, the tool comprising:
        a head portion having a first diameter; and
        a tip portion having a second diameter less than the first diameter, the tip portion having a first portion, a second portion, and a third portion, the first and second portions being separated by a first notch, and the second and third portions being separated by a second notch,
    wherein the first notch is arranged to indicate when the flame arrestor assembly is fully inserted into the first passageway, and wherein the second notch is arranged to indicate when the flame arrestor assembly is fully inserted into the second passageway.

2. The system of claim 1, wherein the head and tip portions are made of Stainless Steel.

3. The system of claim 1, wherein the tool has a first end and a second end opposite the first end, the first portion of the tip portion including the first end, and the head portion including the second end.

4. The system of claim 1, wherein the first end of the tool is chamfered.

5. The system of claim 1, wherein the first end of the tool is flat.

6. The system of claim 1, wherein two or more of the first, second, and third portions have the same diameter.

7. The system of claim 1, wherein the first, second, and third portions have different diameters.

8. The system of claim 1, further comprising a bore partially extending through the tip portion.

9. A system, comprising:
    a process control device having a first passageway of a first depth and a second passageway of a second depth different from the first depth;
    a flame arrestor assembly; and
    a tool for inserting the flame arrestor assembly into the process control device, the tool comprising:
        a head portion having a first diameter; and
        a tip portion having a second diameter less than the first diameter, the tip portion having a first portion and a second portion, the first portion having a first length selected based on the first depth, the second portion having a second length selected based on the second depth.

10. The system of claim 9, wherein the first length is selected to correspond to the flame arrestor assembly being fully inserted into the first passageway, and the second length is selected to correspond to the flame arrestor assembly being fully inserted into the second passageway.

11. The system of claim 9, wherein the head portion has a length greater than a sum of the first and second lengths.

12. The system of claim 9, wherein the first and second portions have the same diameter.

13. The system of claim 9, wherein the first and second portions have different diameters.

14. The system of claim 9, wherein the tool has a first end and a second end opposite the first end, the first portion of the tip portion including the first end, and the head portion including the second end.

15. The system of claim 14, wherein the first end is chamfered.

16. The system of claim 14, wherein the first end is flat.

17. The system of claim 9, further comprising a bore partially extending through the tip portion.

18. A system, comprising:
    a flame arrestor assembly;
    a process control device having a first passageway of a first depth and a second passageway of a second depth different from the first depth; and
    an assembly for inserting the flame arrestor assembly into the process control device, the assembly comprising:
        a tool comprising:
            a head portion having a first diameter; and
            a tip portion having a second diameter less than the first diameter, the tip portion having a first portion and a second portion, the first portion having a first length selected based on the first depth, the second portion having a second length selected based on the second depth; and
        a guide element having a base, a collar extending outward from the base, and a guide bore extending through the base and the collar, the collar having a threaded portion arranged to engage a corresponding threaded portion of the first or second passageway, and the guide bore sized to receive the tip portion of the tool, thereby guiding the tool into the first or second passageway.

19. The system of claim 18, wherein the base has an outer diameter that is greater than an outer diameter of the collar.

20. The system of claim 18, further comprising a bore partially extending through the tip portion of the tool.

* * * * *

UNITED STATES PATENT AND TRADEMARK OFFICE
CERTIFICATE OF CORRECTION

PATENT NO. : 10,004,930 B2  
APPLICATION NO. : 15/193288  
DATED : June 26, 2018  
INVENTOR(S) : Eric J. Burgett et al.

Page 1 of 1

It is certified that error appears in the above-identified patent and that said Letters Patent is hereby corrected as shown below:

On the Title Page

In Column 1, under "Notice", Line 3, "0 days. days." should be -- 0 days. --.

In the Specification

At Column 1, Line 5, "INVENTION" should be -- DISCLOSURE --.

At Column 2, Line 56, "FIG. 2; and" should be -- FIG. 2; --.

At Column 2, Line 59, "FIG. 2." should be -- FIG. 2; --.

At Column 3, Line 3, "FIG. 2; and" should be -- FIG. 2; --.

At Column 10, Line 11, "tool 700" should be -- tool 800 --.

At Column 10, Lines 65-66, "tools 600, 700, and 800" should be -- tools 600, 800, and 900 --.

At Column 10, Line 66, "tool 600, 700, or 800" should be -- tool 600, 800, or 900 --.

At Column 11, Line 1, "tool 600, 700, and 800" should be -- tool 600, 800, or 900 --.

At Column 11, Line 17, "tools 600, 700, or 800" should be -- tools 600, 800, and 900 --.

Signed and Sealed this  
Twenty-eighth Day of April, 2020

Andrei Iancu  
*Director of the United States Patent and Trademark Office*